United States Patent Office 2,783,051
Patented Feb. 26, 1957

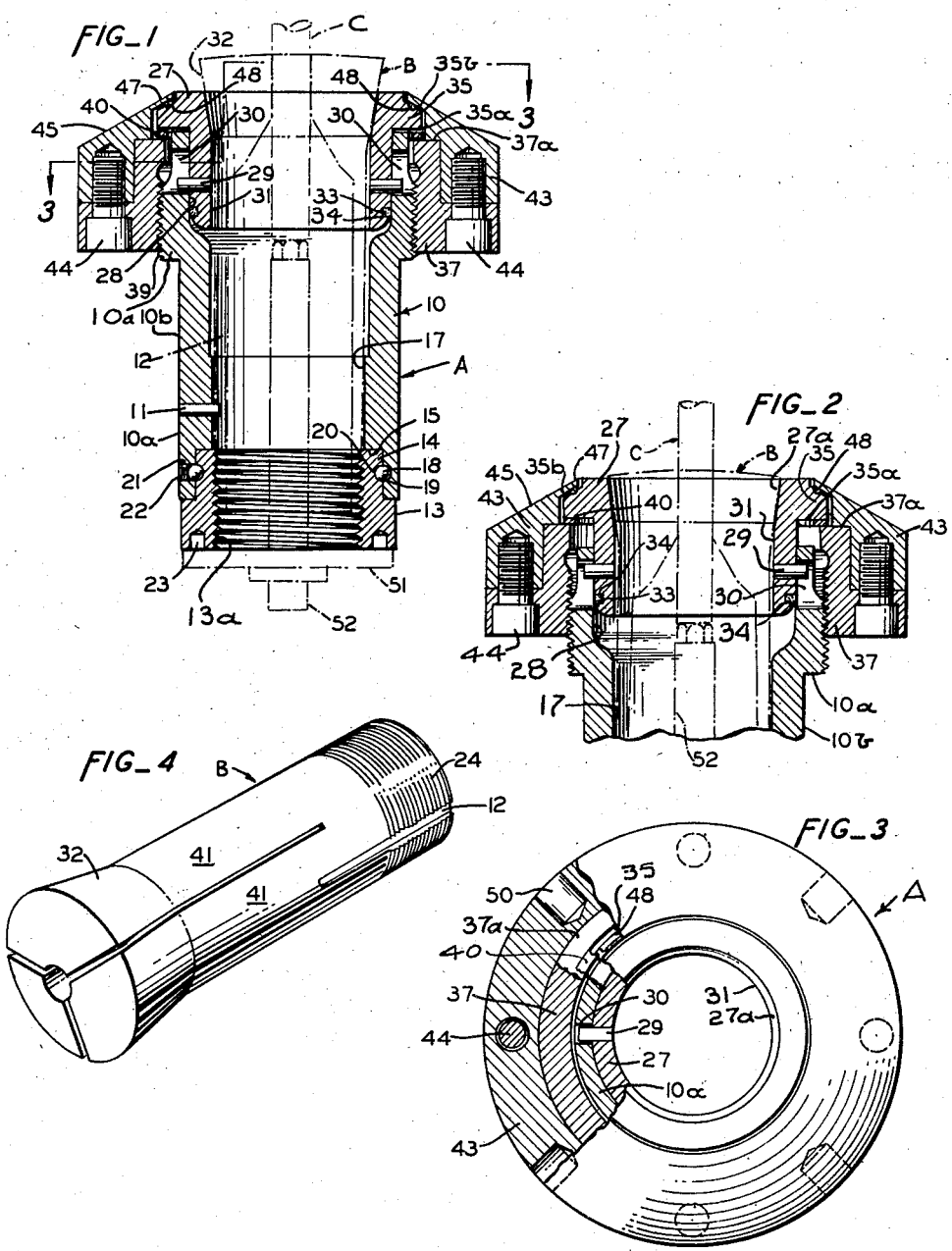

2,783,051
COLLET CHUCK

Nels O. Stromme, San Jose, Calif.

Application June 21, 1954, Serial No. 438,088

8 Claims. (Cl. 279—50)

The present invention relates to a collet chuck, and pertains more particularly to a collet chuck wherein a collet may be either compressed to grip a work piece therein, or released to free the work piece without axial displacement of the collet or of a work piece mounted therein.

In performing various types of machine and bench operations, the use of a collet mounted in a collet chuck holder to grip work pieces and tools frequently saves a substantial amount of time and effort, and at the same time prevents defacing the work piece. However, an inherent disadvantage in most collet chucks resides in their tendency axially to displace the collet or a work piece therein during a final tightening of the collet upon the work piece or tool, or in requiring the use of intricate and expensive mechanism to prevent such axial displacement of the collet.

The present invention contemplates the provision of an improved and simplified collet chuck which will prevent axial displacement of a collet therein during a contractive tightening of the collet by means of the chuck.

A further object of the invention is to provide a collet chuck which is simple and easy to manufacture, is dust free and which permits accurate gripping of successive work pieces or tools without axial displacement thereof during final tightening of the chuck.

These and other objects and advantages of the invention will be apparent from the following description and the accompanying drawings, wherein:

Fig. 1 is a longitudinal sectional view through a chuck embodying the invention, a collet and stop member being shown therein in broken lines, the chuck being shown in collet releasing position.

Fig. 2 is a view similar to Fig. 1 but showing the device in collet compressing or work gripping condition.

Fig. 3 is a plan view of the device shown in Fig. 1, portions thereof being broken away along line 3—3 of Fig. 1.

Fig. 4 is a perspective view of a collet of a type intended for use in the chuck.

Referring to the drawings in detail, the illustrated embodiment of a collet chuck A embodying the present invention comprises a generally tubular body portion 10 with an enlarged, externally threaded outer end portion 10a. A collet positioning pin 11 is mounted in the wall of the body portion 10 to extend into the bore thereof to ride in the usual longitudinal keyway 12 (Fig. 4) with which collets conventionally are provided to hold them against rotation under the torque created by a machining operation during rotation of the chuck A having a collet B mounted therein.

An internally threaded collet seating ring 13 is fitted for rotation in the lower or inner end of the body portion 10. Threads 13a provided interiorly of the collet securing ring 13 are of a pitch and size to threadedly engage the threaded inner end portions 24 (Fig. 4) of the size of collet B to be used in each particular chuck A.

The unthreaded exterior portion 10b of the body 10 is intended for insertion into a holder, such as a machine tool (not shown). For example, when the chuck A is to be used in a lathe, the unthreaded portion 10b (Fig. 1) of the body portion 10 may be inserted in a conventional three or four jawed lathe chuck. However the exterior configuration of the unthreaded body portion 10b may be of any desired shape in the event that the chuck should be intended for gripping in a vise or for use on other machine tools such as a milling machine.

The collet securing ring 13 has a neck portion 14 of reduced diameter fitted telescopically into a portion 15 of larger internal diameter than the bore 17 of the body portion 10, and is rotatively connected to the body portion 10 by a row of bearing balls 18 which are inserted in complementary grooves 19 and 20, respectively in the body portion 10 and in the collet securing ring 13 to register with each other when the ring 13 is fully inserted in the body 10 as shown in Fig. 1. These balls 18 are inserted in the registering grooves 19 and 20 through a hole 21 provided in the wall of the body portion 10 and closed by a plug 22 threaded and brazed in permanently bonded position in the hole after the bearing balls have been inserted in these complementary grooves. The balls thus retain the ring 13 against axial withdrawal from its seat in the body portion 10, and still permit it to rotate freely coaxially therewith.

Usual holes 23 for receiving the nibs of a spanner wrench (not shown) are provided in the exposed end of the ring 13 for tightening it onto the threaded end portion 24 of the shank of a collet B when required.

A collet compressing sleeve 27 is fitted for free axial slidable movement in an enlarged upper bore portion 28 at the upper end of the bore 17 through the body portion 10. A pair of radially projecting guide and limit stop pins 29 are mounted to extend from diametrically opposite points of the collet compressing sleeve 27, the outer ends of these pins riding in longitudinally extending guide slots 30 provided therefor in the body portion 10. The upper end of the bore 31 of the collet compressing sleeve 27 is flared outwardly at 27a to conform to the conical slope of the usual divergent conical peripheral face 32 provided on the outer end of the collet B.

A dust seal ring 33, which may be of oiled felt, is mounted in annular groove 34 provided therefor around the inner end of the collet compressing sleeve 27 to have light frictional engagement with the enlarged upper bore portion 28 of the body 10.

A radially outwardly extending flange 35 is provided around the outer end of the collet compressing sleeve 27 to extend beyond the enlarged outer end portion 10a of the body portion 10 and to overlie the outer end of an annular actuating member 37 which is threadedly mounted on the externally threaded enlarged outer end portion 10a of the body 10. The threads interconnecting the actuating ring 37 and the body 10 preferably are of left-hand pitch so that the device may be tightened on a collet therein by rotating the actuating ring 37 toward the right relative to the body, which is a common direction to rotate a chuck sleeve to tighten the chuck on a tool or work piece inserted therein.

The axially outward end of the threaded actuating ring 37 has a flat bearing face 37a formed thereon for thrust bearing action on a friction reducing thrust washer 40, which may be of bronze, and which is inserted between this face 37a and a corresponding flat bearing face 35a provided on the axially inward side of the flange 35 on the collet compressing sleeve 27. Thus, when the actuating ring 37 is screwed outwardly to the position shown in Fig. 2, the friction reducing thrust washer 40, riding on the outer end face 37a thereof, urges the collet compressing sleeve 27 axially outwardly to cause the jaws 41 of the collet B to contract about a work piece or tool C inserted in the collet.

An annular sleeve retracting member 43 is fitted onto the actuating ring 37 and is secured thereto by a plurality of recessed head screws 44 of conventional type. The upper or outer surface 45 of the retracting ring 43 is of truncated conical shape to provide adequate clearance for tools and tool holders of a machine tool such as a lathe when machining a work piece held in a collet B in the chuck A. A radially inwardly extending flange 47, sloped to conform to the axially outward surface 45 of the retracting ring 43, is provided in the retracting ring 43 to overlie the correspondingly sloped outer end face 35b of the radial flange 35 on the collet compressing sleeve 27. A sealing gasket 48, which may be of oil saturated felt, is mounted in an annular groove provided therefor in the outer face 35b of the flange 35 to ride against the inner face of the sloping flange 47. Thus, when the threaded sleeve actuating ring 37 is screwed axially inwardly (to the left with the preferred left hand threads) on the external threads on the enlarged outer end of the body portion 10, the overlying flange 47 will force the collet compressing sleeve 27 axially inwardly, or downwardly as shown in Figs. 1 and 2, to free the sleeve 27 from a collet B whose threaded inner end is held in the threaded collet mounting ring 13.

In using the chuck of the present invention, when the sleeve actuating assembly consisting of the threaded actuating ring 37 and the retracting ring 43 secured thereto is screwed outwardly the outer end face 37a of the ring 37 exerts an axially outward thrust against the thrust washer 40, which in turn forces the collet tightening sleeve 27 axially outwardly to exert a collet compressing camming action upon the conical peripheral surface 32 of the collet B. This camming action tightens the jaws 41 of the collet about a work piece or tool C (broken lines in Figs. 1 and 2) which may be inserted in the bore thereof. The collet B may be released to free a work piece or tool gripped therein by reversing this latter operation.

It will be noted that during either outward or inward axial movement of the collet tightening sleeve 27 the collet B is firmly held against axial displacement relative to the body portion 10 by the rotatable ring 13 into which it is screwed. Thus once the body portion 10 is mounted in proper axially adjusted position, the chuck A may be actuated to either grip or release a work piece or tool C in the collet B mounted in the chuck without danger of axially displacing the work piece or tool.

A plurality of holes 50 (Fig. 3) are provided in the periphery of the retracting ring 43 to permit use of a usual type spanner wrench, not shown, for tightening and loosening the actuating ring 37 and its associated parts when required.

For successively mounting a plurality of work pieces or tools one after another in the collet to perform identical operations thereon, a conventional stop member 51 consisting of an externally threaded plug having threads thereon of a size and pitch to screw into the threaded ring 13 may be screwed therein as shown in Fig. 1 to lie wholly beyond the collet.

A usual threaded stop screw 52 is screwed into a threaded hole provided therefor axially of the plug 51. Thus the stop member 51 does not interfere with the mounting of the chuck in a machine tool or other support, or with the mounting of a collet B in fully seated position in the chuck A.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. A collet chuck comprising a tubular body, external threads on one end of said body, a collet compressing sleeve mounted for axial slidable movement in said body at the threaded end thereof, a conical cam face formed coaxially in the outer end of the sleeve, an annular flange extending radially from said sleeve, axial guide means mounted to retain the sleeve against rotation relative to the body, an internally threaded collet mounting ring journaled coaxially on the body, and an annular member threadedly mounted on the threaded body portion and having an annular groove therein within which the annular flange on the sleeve is mounted for relative rotative movement.

2. A collet chuck comprising a tubular body, external threads on one end of said body, a collet compressing sleeve mounted for axial slidable movement in said body at the threaded end thereof, a conical cam face formed coaxially in an outer end of the sleeve, an annular flange extending radially from said sleeve at the outer end thereof relative to said body, axial guide and limit stop means mounted between the body and the sleeve to prevent rotation and to limit axial movement between the sleeve and the body, means for mounting a collet in said body with a conical cam surface of the collet within the conical cam face in the sleeve, and an annular member threadedly mounted on the threaded body portion and having an annular groove therein within which the annular flange on the sleeve is fitted for relative rotative movement therein, the axially directed sides of the groove being positioned closely adjacent opposite axially directed sides of the sleeve flange to move the sleeve axially in a selected direction upon a predetermined relative rotative movement between the body and the threaded annular member.

3. A collet chuck comprising a tubular body portion, an enlarged, externally threaded, coaxial tubular end portion thereon, a collet compressing sleeve telescopically inserted in the enlarged end portion, guide means interconnecting the sleeve and the body portion to retain the sleeve against rotative movement during axial slidable movement of the sleeve, an internally threaded actuating ring threadedly mounted on the enlarged body portion and in axial thrust engaging relation with an axially directed sleeve element, a sleeve retracting member mounted on said actuating ring and in thrust engagement with an axially oppositely directed sleeve element, and an internally threaded collet journaled coaxially on the body for relative rotative movement thereon.

4. A collet chuck comprising a tubular body portion having an enlarged, externally threaded, coaxial tubular end portion thereon, said enlarged end portion having a longitudinally extending slotted guideway therein, a collet compressing sleeve mounted for limited axial slidable movement in said enlarged end portion, guide means on said collet compressing sleeve in slidable engagement with said slotted guideway to prevent relative rotation of the sleeve and body member, an internally threaded actuating ring threadedly mounted on the enlarged body portion and in axial thrust engaging relation in one direction with the sleeve, a sleeve retracting member mounted on said actuating ring and in axial thrust engagement in the opposite direction with the sleeve, an internally threaded collet engaging ring mounted for rotative movement coaxially of the body on the opposite end of the body from said enlarged threaded end portion, a row of bearing balls interposed between the body portion and the internally threaded ring to resist relative axial movement between the body member and the internally threaded ring during rotative movement of the latter ring.

5. A chuck for a collet having a threaded portion at one end thereof and a conical cam face at the other end thereof, said chuck comprising a tubular body portion, a collet compressing sleeve mounted for slidable, axial movement in said body portion, an internally threaded collet engaging ring rotatively mounted on the body portion, guide means interconnecting the sleeve and the body portion to prevent rotative movement of the sleeve relative to the body portion, a conical collet contracting face formed coaxially on said sleeve, and an annular sleeve actuating member threadedly mounted on said body portion and a thrust bearing disposed annularly around the sleeve, and interconnecting the sleeve and the sleeve actuating member for common axial, and free, relative rotative movement.

6. A collet chuck comprising a tubuar body portion, a longitudinally extending guide slot of limited extent adjacent one end of said body portion, a collet compressing sleeve mounted for slidable, axial movement in said one end of the body portion, collet securing means on the other end of the body portion, a combined guide and limit stop member on said sleeve riding in said slotted guide way in said body portion to prevent rotative movement of the sleeve relative to the body portion and to limit relative axial movement between said sleeve and body portion, a tapered collet contracting face formed on an outer end of said sleeve, a radially extending flange on the outer end of said sleeve beyond the body portion, an annular sleeve actuating member threadedly mounted on said one end of the body portion and having thrust bearing engagement with both inner and outer axial faces of said flange for moving the flange and the sleeve on which it is provided axially of said body within the limits of movement provided by said limit stop and guide means upon relative rotative movement between the body and the threaded sleeve actuating member selectively to grip or release a collet mounted in the collet securing means.

7. A chuck for a collet having a threaded portion on one end and a coaxial conical cam face on the other, comprising a threaded tubular body member, a collet compressing sleeve mounted for axially slidable movement in one end of said body member, a collet securing member rotatably mounted on the other end of the body member, a tapered collet contracting cam face formed within said sleeve, an annular sleeve actuating member threadedly mounted on the body portion and a thrust bearing interconnecting the sleeve and the sleeve actuating member for common axial and free relative rotative movement, thereby to move said sleeve axially of the body with the sleeve actuating member upon relative rotative movement between the body and the threaded sleeve actuating member to force the cam face in the sleeve into compressing engagement with the cam face on the collet.

8. A chuck for a collet having an externally threaded portion at one end and a coaxial cam face at the other, comprising a tubular body member, a collet compressing sleeve mounted for slidable, axial movement in one end of said body member, an internally threaded collet securing ring in coaxial interfitted relation in the other end of the body member, said body and said ring having registering complementary grooves of semi-circular cross sectional shape therein, a plurality of bearing balls riding in said grooves to provide thrust bearing connection between the body member and the ring, a tapered collet contracting face formed within an outer end of said sleeve, an annular sleeve actuating member threadedly mounted on said one end of the body portion and having thrust bearing engagement with the sleeve to move said sleeve axially of said body upon relative rotative movement between the body and the threaded sleeve actuating member selectively to grip or release a collet mounted in the collet securing means.

References Cited in the file of this patent
FOREIGN PATENTS

| | | |
|---|---|---|
| 551,720 | Great Britain | Mar. 18, 1943 |
| 560,250 | Great Britain | Mar. 27, 1943 |
| 231,299 | Switzerland | June 1, 1944 |
| 480,965 | Canada | Feb. 12, 1952 |